United States Patent
Sherman

[11] 3,770,074
[45] Nov. 6, 1973

[54] REDUCTION DRIVE FOR ELECTRIC AXLE

[75] Inventor: Warren S. Sherman, Indianapolis, Ind.

[73] Assignee: General Motors Corporation, Detroit, Mich.

[22] Filed: Apr. 24, 1972

[21] Appl. No.: 246,694

[52] U.S. Cl.............. 180/65 F, 74/674, 180/43 B, 184/6.12
[51] Int. Cl............................................. B60k 7/00
[58] Field of Search .............. 180/65 F, 66 F, 43 B; 184/6.12; 192/4; 74/705, 674, 467

[56] References Cited
UNITED STATES PATENTS

| | | | |
|---|---|---|---|
| 3,387,502 | 6/1968 | Le Tourneau................ | 180/43 B X |
| 3,055,448 | 9/1962 | Fagel............................ | 180/65 F X |
| 3,477,547 | 11/1969 | Kress et al. .................... | 184/6.12 X |
| 3,359,829 | 12/1967 | Busch et al. ........................ | 74/705 |
| 3,062,073 | 11/1962 | Brass.................................... | 74/674 |
| 3,290,096 | 12/1966 | Stalker............................. | 74/674 X |
| 3,319,746 | 5/1967 | Christenson et al. ............... | 192/4 B |
| 3,572,480 | 3/1971 | Nagel.................................. | 192/4 B |
| 3,363,728 | 1/1968 | Stengelin......................... | 192/4 B X |

Primary Examiner—Kenneth H. Betts
Assistant Examiner—David M. Mitchell
Attorney—W. E. Finken et al.

[57] ABSTRACT

A drive axle assembly having a tubular support housing adapted to be mounted on a vehicle frame and rotatably supporting a driving wheel. A high speed electric motor mounted on the inboard end of the support housing driving an inboard reduction gearset which is connected by an intermediate shaft rotating at an intermediate speed to drive an outboard reduction gearset at the outboard end of the support housing. A hydrodynamic brake rotor rotates with the intermediate shaft between stator blades fixed to the support housing. The outer end of the support housing is closed by a rotary housing attached to the wheel. A common hydraulic system provides a single fluid for the motor cooling circuit, hydrodynamic retarder and gear lubrication.

12 Claims, 2 Drawing Figures

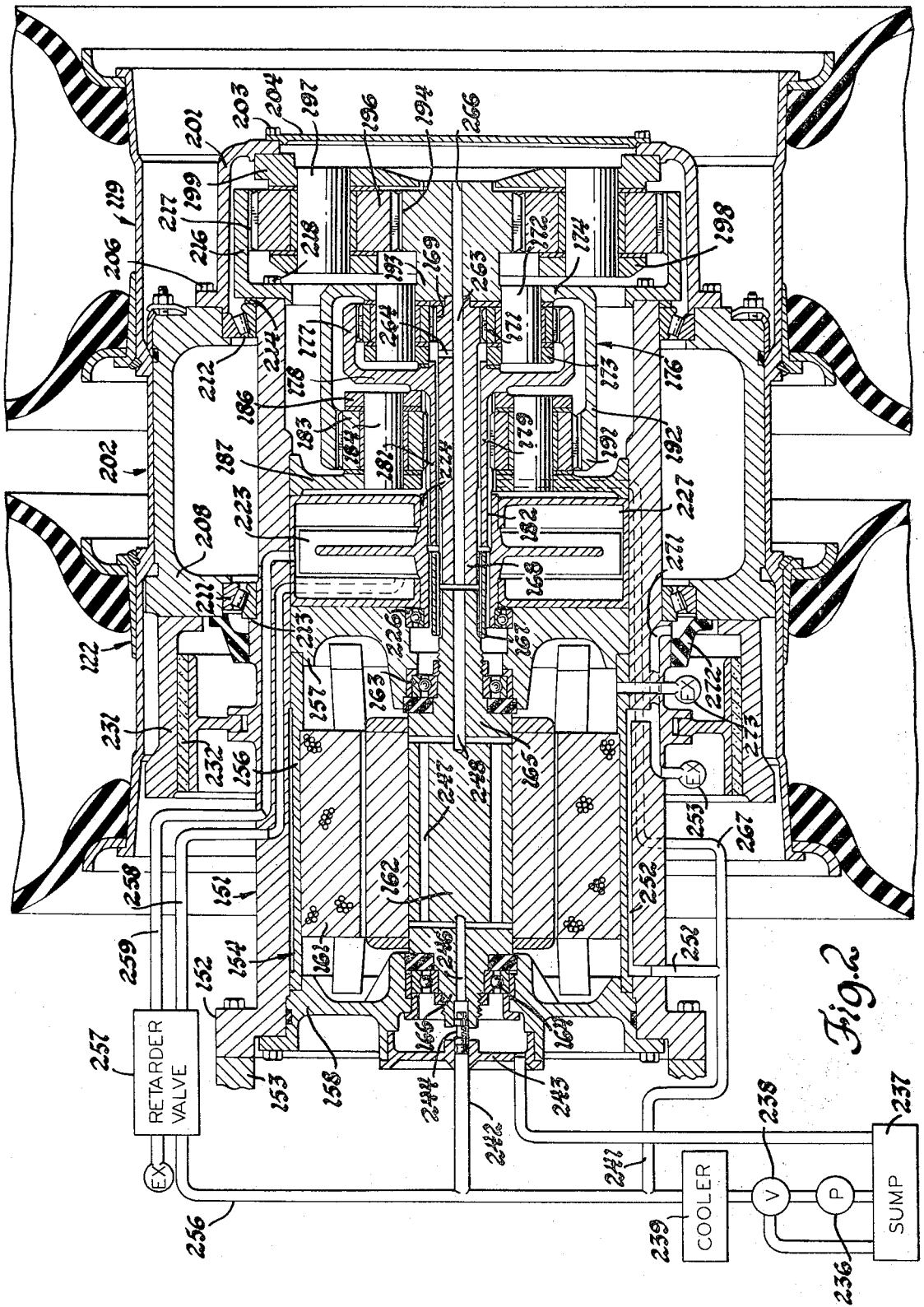

REDUCTION DRIVE FOR ELECTRIC AXLE

This invention relates to drive axle assemblies and particularly to reduction drive axle assemblies.

The drive axle assembly according to this invention provides a compact simple planetary reduction drive of about 80 to 1. The reduction gearing uses a three-element gear unit having a central gear, a ring gear and a pinion gear and a compound planetary gear unit connected in series. The compound planetary gear unit has a first and second gearset each having a carrier with pinions meshing with a sun and ring gear with the drive to the first sun gear, the first ring gear connected to the second sun gear, a stationary second carrier and the first carrier and second ring gear connected to output.

This drive axle assembly has a fixed tubular support housing open at both ends. The electric drive motor is electrically controlled for forward and reverse variable speed drives and is attached to and closes the inboard portion. The wheel is rotatably mounted by wheel bearings supported on the external outboard portion of the support housing. Reduction gearing is located within and beyond the open outboard end of the support housing. The gearing and open outboard end of the support housing is enclosed by a rotary housing including the wheel, a drum and cover. A seal between the wheel and support housing on the inboard side of the inboard wheel bearing seals the rotary housing to the external surface of the support housing to provide a closed lubrication chamber for the wheel bearings and reduction gearing. In one arrangement a stepped tubular support housing has a large diameter inboard portion to support the motor, the inboard reduction gearing and retarder and a reduced diameter tubular portion having an intermediate connecting shaft member extending through it to drive the outboard reduction gearing and wheel mounted externally on the reduced diameter tubular portion. In another arrangement a cylindrical tubular support housing encloses and supports the motor, retarder and reduction gearing which drives the wheel mounted externally on the support housing.

The axle assembly has a hydrokinetic retarder having a bladed stator fixed within the support housing and a bladed rotor fixed for rotation with an intermediate member of the reduction gearing so it rotates at an intermediate speed about 15 to 20 times wheel speed to provide high brake torque with a small diameter rotor at low wheel speeds. In one arrangement having the motor driving a simple inboard pinion type reduction gearset connected by an intermediate shaft member to the outboard compound planetary reduction gearing which drives the wheel, the retarder rotor is connected to the intermediate member. In the arrangement having the motor driving the outboard compound planetary gearset, which has an intermediate compounding connection member, driving a simple planetary reduction gearset which drives the wheel, the intermediate member drives the retarder rotor.

The axle assembly has a common fluid supply system to supply fluid, such as transmission fluid, to the motor cooling system, the retarder control system and the gearing and bearing lubrication system The motor cooling system has a stator portion and a rotor portion with bleeds to lubricate the motor bearings and is connected to lubricate the gearing and bearings. A retarder control valve controls the feed to and exhaust from the retarder. The gearing and gear and wheel bearings are supplied with fluid for lubrication directly and from the rotor cooling system. The lubrication fluid collects and is exhausted under the centrifugal pressure head at the outer perimeter of the rotary housing. In one arrangement having wheel bearings with a small diameter compared to the gearing, a scoop tube, having an open end facing the rotating annular body of fluid, and a central exhaust passage, exhausts the fluid. In the arrangement having wheel bearings about the diameter of the gearing, the fluid flows under a centrifugal pressure head through the wheel bearings to an exhaust at about the same diameter as the wheel bearings.

These and other features of the invention are described in detail in the following description and drawings.

FIG. 1 is a sectional view of the axle assembly and diagrammatically shows the fluid supply system.

Figure 2:
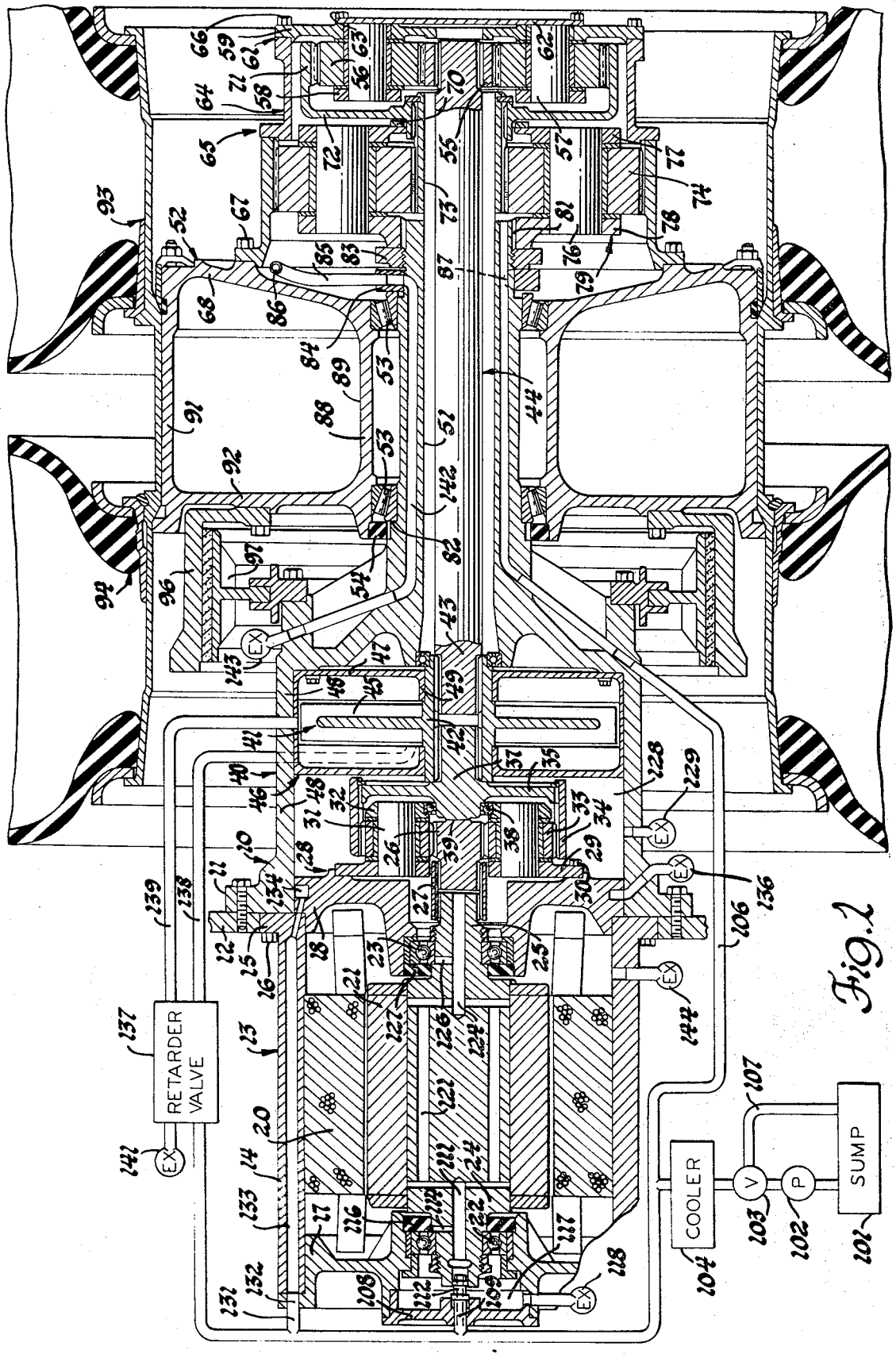
FIG. 2 is a sectional view of a modified axle assembly and diagrammatically shows the fluid supply system.

The drive axle assembly shown in FIG. 1 has an axle structure, or tubular support housing, 10 having an inboard flange 11 suitably secured to a suspended portion 12 of the vehicle suspension system. The high speed electric drive motor 13 has a cylindrical housing 14 having a flange 15 suitably secured by screws or bolts 16 to the flange 11 and end walls 17 and 18. The motor has a stator or fixed coil 20 secured in the motor housing and a rotor or armature 21 rotatably mounted by bearings 22 and 23 respectively fixed in the end walls 17 and 18 of housing 16. The armature 21 has a support shaft 24 rotatably supported in bearing 22 and an output shaft portion 25 rotatably supported in bearing 23 and connected to a sun gear 26 by a splined connecting sleeve 27 splined to the shaft 25 and sun gear 26 of the inboard reduction gearset having a reduction ratio of 4 to 1. A pinion gear carrier member 28 has a disc portion 29 secured by suitable screws 30 to the end wall 18 of the motor. A plurality of pinion shaft 31 are fixed to the annular plate 29 and an annular plate 32. A pinion 33 is rotatably mounted by suitable bearing means on each pinion shaft 31 and meshes with sun gear 26 and ring gear 34 which is drive connected by drive disc 35 and an integral intermediate shaft stub portion 37 extending inboard and outboard from the disc. The intermediate shaft stub portion 37 is supported at the inboard end adjacent the motor by a bearing 38 fixed in the inner diameter of the annular member 32 and has a thrust bearing interface 39 with sun gear 26.

A hydrodynamic brake 40 has a rotor 41 having a hub 42 internally splined to the externally splined intermediate shaft stub portion 37 and intermediate shaft outboard portion 43 forming intermediate shaft 44. The rotor 41 has an annular disc portion with a plurality of transverse blades 45. The hydrodynamic stator 46 consists of an annular housing 47 mounted within, and fixed to, the cylindrical inboard portion 48 of the axle structure 10. The housing 47 is closed at its outer perimeter and has inwardly extending sealing flanges 49 on each side of the stator and engaging the relatively rotating hub 42 in sealing relation.

The axle structure 10 has a reduced diameter axle portion 51 extending through the wheel assembly 52 and supporting it on a pair of, or inboard and outboard, opposed thrust and rotary bearings 53. An inboard seal 54 seals the rotary wheel 52 to the fixed housing 10 on the inboard side of inboard bearing 53. The outboard end of intermediate shaft 44 extends beyond the open outboard end of axle portion 51 and has a sun gear 55 splined thereto. The sun gear 55 meshes with a plurality of planetary pinions 56 rotatably mounted on pinion shafts 57 which are fixed in the annular discs 58, 59 of the carrier assembly 61. The carrier assembly 61 has a cover plate 62 secured and sealed to the carrier plate 59 by suitable screws 63 radially outward of the pinion shafts 57 to seal the end of the rotary gear housing assembly 64 provided by the cover 62, carrier plate 59, drum assembly 65 and wheel 52. The carrier is secured to the drum 65 by screws 66. Screws 67 secure the other end of the drum structure to the radial wall 68 of the wheel assembly 52.

The pinions 56 mesh with ring gear 71 which has a radial disc 72 axially positioned by thrust washers 70 between plates 58 and 77 of the adjacent carriers and splined drive connected to the sun gear 73 inboard of the sun gear 55. The sun gear 73 meshes with a plurality of planetary pinions 74 rotatably mounted by suitable bearings on pinion shafts 76 fixed in the side plates 77, 78 of the pinion carrier 79 which by means of the splined connection 81 between plate 78 and the axle structure portion 51 is grounded to the vehicle frame. Pinions 74 also mesh with the ring gear 80 of drum 65. This outboard dual reduction gearset has a reduction ratio of 21 to 0 for an overall reduction ratio of 84 to 1.

Bearings 53 which rotatably support the wheel assembly 52 are located on the inboard side by shoulder 82 positioning inboard bearing 53 and on the outboard side the outboard bearing 53 is adjustably located by the threaded ring 83 threaded on the axle portion 51 which engages the scoop tube ring 84. The scoop tube ring has a tube 85 extending to the outermost portion of rotary gear housing 64 and there having an open end 86 facing in a direction opposite the normal direction of rotation of the wheel, generally provided by an L shape tube, to receive rotating fluid, oil, and deliver it through tube 85 in forward drive. In an application having extended reverse drive, instead of the L shape tube 85, a T shape tube with the bar portion of the T tube having oppositely facing open ends, each like open end 86, one receiving fluid in forward drive and the other receiving fluid in reverse drive, is used. A one-way check valve in the bar between each open end and the stem portion of the T tube or a plug or ball shuttle valve having free limited movement in the bar to opposite sides of the stem connects either open end when pressurized to deliver fluid to the stem portion and blocks the other open end to receive and deliver fluid through the T tube in forward and reverse drive. The scoop tube ring 84 is suitably keyed by key 87 to axle portion 51 to prevent rotation but permit a little axial movement for bearing adjustment. The wheel assembly 52 includes a box-like portion 88 mounted on the bearings 53 and having the cylindrical inner wall 89 and a cylindrical outer wall 91 interconnected by the generally radial sidewalls 68 and 92. The wheel rim and tire assemblies 93 and 94 are suitably secured to the outer wall 91. A brake drum 96 is suitably secured to wall 92 and has a brake shoe mechanism 97 therein which is mounted on the cylindrical housing portion 48. This axle assembly has a common fluid system for supplying fluid such as a type of oil suitable for the motor cooling system, the retarder system and the lubrication system. As shown diagrammatically in FIG. 1, the fluid supplying control system has a sump 101 and fluid is supplied from the sump by the pump 102 at a pressure regulated by a regulator valve 103 and cooled by the cooler 104 to the main fluid supply line 106. Excess fluid from the regulator valve 103 is returned to sump by exhaust line 107. The main line 106 is connected through the bearing cover 108 on the end wall 17 of the motor. The main line passage 109 in the cover 108 and the cooling passage 111 in motor shaft 24 are connected by a transfer tube 112 sealed to these passages between the nonrotary cover 108 and rotary shaft 24. A bleed passage 114 supplies some of this fluid to lubricate the bearing 22 and the seal 116 prevents flow to the motor housing portion containing the motor rotor and stator so that excess fluid drains through the chamber 117 to exhaust 118. All such exhausts are connected to sump by suitable piping, not shown. The axial cooling passage 111 is connected by a plurality of radial and axial passages 121 extending through the rotor, radially outwardly, then axially and then radially inwardly to the axial passage 124 at the other end of the motor rotor in the shaft portion 25. A similar bleed passage 126 supplies fluid to lubricate the bearing 123. The fluid is blocked from the motor chamber by the seal 127 and drains through wall 18 into the inboard reduction gearset chamber 128 for lubrication of this gearset. Cooling passage 124 has a transverse portion which is connected via spaces in the splines of spline sleeve 27 to provide the main supply of fluid to lubricate the inboard reduction gearing. All lubricating fluid supplied to the inboard reduction gearset in chamber 128 drains to exhaust 129. The main line 106 is also connected by a branch 131 and an annular chamber 132 to a plurality of stator cooling passages 133 extending axially the length of the motor to the opposite end of the motor stator where they are connected to an annular groove 134 which is connected to exhaust 136. The main line 106 is also connected by a retarder valve 137 to a retarder inlet line 138. A retarder outlet line 139 is blocked or connected to exhaust 141 by the retarder valve. The retarder valve in the retarder on position connects main line 106 to retarder inlet or feed line 138 to supply fluid to fill the retarder chamber and blocks or limits the pressure in retarder outlet line 139 for retarding, and in the retarder off position, blocks the connection for the main line 106 to the feed line 138 and connects the retarder outlet line 139 to exhaust 141. The particular retarder valve shown in patent 3,319,746 Christenson et al, issued may 16, 1967, may be used. The main line 106 is also connected by suitable bores through the axle housing portion 48 in the intermediate radial portion to the reduced diameter portion 51 terminating in the end wall thereof to feed lubricant fluid to the outboard gearset which lubricates the outboard reduction gearing and is thrown against the internal surface of the outer perimeter wall of the rotary gear housing 64 where it impinges on the open end 86 of the scoop tube and is fed through the scoop tube 85 and a passage in the scoop tube ring 84 to the axial passage 142 which extends through the axial housing portion 51 and the intermediate radial portion to portion 48 where it is connected to exhaust 143. The motor chamber may have exhausts such as exhaust 144.

In this drive axle assembly, the electric motor has an electric control system providing forward and reverse drives at speeds from zero to 12,000 rpm. The inboard reduction gearset 26 has a speed reduction 4 to 1 so that the intermediate shaft 44 rotates at one fourth speed. In the output gearset 80, the speed is further reduced by a reduction ratio of 20 to 1 to provide a total reduction drive between the electric motor 13 and the wheel assembly 52 of 80 to 1. The hydrodynamic brake 40 has its rotor 41 connected to the intermediate shaft 40 which rotates at 20 times wheel speed and thus, the small volume hydrodynamic brake provides a high retarding force for its size. The outboard gearset is completely enclosed by the rotating housing 64 which includes the wheel and the rotating gear housing the portions surrounding the gearing, consisting of the cover plate 62, the carrier plate 59 and the drum 65. This outboard reduction gear housing and rotary housing is sealed to the axle housing by the seal 54 on the inboard side of the inboard bearing and supplied by lubricating fluid or oil by a line 138. The scoop tube 85 evacuates oil from the housing via line 142 to return it to the sump. The axle housing 10 supports at the inboard portion the electric motor and has contained in the enlarged inboard portion 48 the inboard reduction gearset and hydrodynamic brake. The intermediate reduced portion 51 of the axle housing externally rotatably supports the wheel assembly 52 and extends beyond the wheel assembly to support and provide reaction for the outboard reduction gearset 80 which is completely enclosed in the rotary cup-shaped gear housing 65 formed as a part of the wheel assembly.

The modification shown on FIG. 2 has a cylindrical axle or support housing 151 having a flange 152 for securing the axle housing to a suspended portion 153 of the suspension system. The motor 154 has a housing having a cylindrical portion 156, an outboard end wall 157 and an inboard wall 158 mounted within flange 152 of the axle housing 151. The motor has a stator 161 fixed to the cylindrical housing portion 156 and a rotor 162. Bearings 163 and 164 respectively mounted in bores in the walls 157 and 158 rotatably support the output shaft 165 and the input shaft 166. The motor armature output shaft 165 extends through the bearing 163 and within wall 157 is splined to the splined sleeve coupling 167 which is also splined to the extension shaft 168 which has on its other end sun gear 169. The sun gear 169 meshes with a plurality of planetary pinions 171 each rotatably mounted on planetary pinion shafts 172 which are fixed in the spaced annular walls 173 and 174 of the carrier assembly 176. Pinions 171 also mesh with a ring gear 177 connected by a radial drive disc 178 to a sleeve shaft 179 which has thereon a sun gear 181 and a spline extension 182 providing an intermediate gear drive member for driving the hydrodynamic brake as described below. The sun gear 179 meshes with a plurality of planetary pinions 183 each mounted on a pinion shaft 184 fixed in the spaced annular plate members 186 and 187 forming a carrier assembly. Plate 187 is splined or otherwise fixed to the internal diameter of the cylindrical axle 151 to hold this carrier assembly and pinion shafts against rotation. The ring gear 191 is part of the drum portion 192 of carrier assembly 176. The carrier assembly 176 also has a shaft portion 193 having a sun gear 194 meshing with a plurality of planetary pinions 196 each mounted on a pinion shaft 197 fixed in the spaced annular discs 198 and 199. This carrier assembly 198, 199 is drive connected by the drive drum 201 to the wheel structure 202. The screws 203 secure a cover plate 204 to drum 201 to close its opened end.

The screws 206 secure the other flanged end of drum 201 to the wheel assembly 202. The wheel assembly 202 has a hub portion 208 mounted on bearings 211 and 212. The bearing 211 is located by shoulder 213 and the bearing 212 is located by shims 214 abutting a drum 216 of ring gear 217 which meshes with pinion gears 196 which is secured by screws 218 to the end of the axle structure 151. The wheel assembly 202 also includes the wheel rim and tire structures 219 and 222. The hydrodynamic brake 222 has a rotor 223 with rotor blades and a hub portion 224 having internal splines connected to spline extension 182 of sleeve shaft 179 and is rotatably supported by bearing 226 mounted in the inner aperture of wall 157. The hydrodynamic brake stator consists of a housing 227 having blades on each side of the stator blades and has side walls sealed at their inner diameter to the rotor 223. A brake drum 231 is secured by suitable screws to the wheel member side 208 and has conventional brake shoes and brake actuating mechanism 232 mounted on the axle structure 151.

The axle assembly shown in FIG. 2 also has a common fluid supply system for motor cooling, retarder operation and lubrication. A pump 236 supplies fluid from sump 237 at a pressure regulated by regulator valve 238 and cooled by cooler 239 to main line 241. As in FIG. 1, a main line branch 242 supplies fluid through bearing cover 243, via transfer tube bushing 244, to passage 246 in support shaft 166. The passage 246 is connected by a plurality of radial, axial and return radial passages 247 to passage 248 in the rotor output shaft 165. The motor stator is cooled by fluid supplied by main line branch 251 which supplies axial passages 252 in the stator and exhaust at exhaust 253. The main line branch 256 is blocked or connected by retarder valve 257 to retarder inlet line 258 and retarder outlet line 259 is connected to exhaust or blocked to disengage or engage the retarder as in FIG. 1. The intermediate shaft 168 has a passage 263 and branch 264, a shaft 193 and passage 266 providing a continuation of passage 248 to lubricate the gearing. Main line branch passage 267 extending through the housing and to the inner diameter of the fixed plate 187 also supplies lubricant to the gearing. The rotary gear housing, consisting of cover plate 204, drum 201 and wheel 202 collects oil at its inner perimeter and this annular volume of oil flows through bearings 212 and 211 to exhaust line 271 which is located between bearing and seal 272 between the wheel and support housing 151. The line 271 is connected to exhaust 253. The motor housing may have one or more exhausts 273.

In the FIG. 2 arrangement, the high speed electric motor drives the input shaft at zero to 12,000 rpm. The compound reduction gearing, illustrated, provides a reduction ratio of 20 to 1 and the outboard simple planetary reduction gearset provides about a 4 to 1 (4.37) reduction for an overall 88 to 1 reduction ratio. The intermediate compounding member 178 connecting ring gear 177 and sun gear 179 and having portion 181 and spline portion 182 driving retarder rotor 223 rotates at 17.48 times wheel speed during wheel overrun or when the wheel is driving. When the wheel is driving, the wheel drives through the outboard gearset, having a ring gear 217, pinions 196 and sun gear 194 and providing a 1 to 4.37 speed multiplication ratio and then through the inboard gearset, having pinions 183, ring gear 191 and sun gear 179 and providing 1 to 4 speed multiplication so there is a combined 1 to 17.48 speed multiplication ratio.

It will be appreciated that the above illustrative embodiments of the invention may be modified.

It is claimed:

1. In a drive axle assembly, a support housing; a high speed drive shaft rotatably mounted on said support housing; reduction gearing and a wheel rotatably mounted on said support housing; said reduction gearing connecting said drive shaft to drive said wheel and having a speed reduction ratio of large value between said shaft and wheel during drive by said shaft to said wheel and having an intermediate member driven during overrun of said wheel at a speed multiplication ratio of intermediate value between said wheel and intermediate member and a hydrodynamic retarder having a stator fixed to said support housing and a rotor fixed to said intermediate member and rotating at a high speed relative to said wheel to provide a high torque capacity small diameter retarder effective at low wheel speeds.

2. The invention defined in claim 1 and said reduction gearing having two planetary type reduction gearsets between said wheel and intermediate member and one planetary type additional gearset in series with said two planetary type reduction gearsets for driving said wheel.

3. The invention defined in claim 1 and said reduction gearing having a compound dual planetary gear assembly between said intermediate member and wheel providing the same speed ratio during drive and during overrun.

4. The invention defined in claim 1 and said reduction gearing having a dual gear unit operating as a compound dual planetary gear unit during drive by said shaft and as a single simple planetary type gear unit providing a lower speed ratio during drive by said wheel.

5. The invention defined in claim 1 and said reduction gearing having a first simple reduction gearset driven by said shaft and a second compound dual planetary gear unit having about four times the reduction ratio of the gearset connected by said intermediate member and said second gear unit driving said wheel to provide during said drive the total reduction of both the gearset and gear unit and on overrun the gear unit has the same speed reduction ratio inverted to become a speed multiplication ratio to drive the intermediate member at an intermediate high speed relative to wheel speed.

6. The invention defined in claim 1 and said reduction gearing having a compound dual planetary gear unit with two compounded gearsets having the intermediate member connected between the gear sets; a simple planetary gearset driven by said gear unit and driving said wheel and all three gearsets functioning during drive by said shaft to provide a high reduction speed ratio to said wheel and on overrun without drive by said shaft said simple planetary gearset and one set of said dual compound gear unit functioning to provide only the intermediate speed multiplication of said simple planetary gear set and said one set to drive said retarder rotor at a high intermediate speed relative to wheel speed.

7. In a drive axle assembly; a tubular support housing having an inboard portion and an open outboard end; a high speed electric motor mounted on the inboard portion of said tubular support housing and having an output shaft extending coaxially of said tubular support housing; an intermediate gearset located first reduction gearing driven by said motor shaft and driving said intermediate drive member; a wheel rotatably mounted on an intermediate external portion of said tubular support housing; a cup-shaped closure housing on and secured to said wheel for rotation with said wheel and enclosing the outboard end of said tubular support housing; stator reduction gear means including at least a portion located between said outboard end of said support housing and said closure housing and within said closure housing driven by said intermediate member and drivingly connected to drive said wheel; a retarder a rotor connected for rotation with said intermediate member for rotation at a speed intermediate the high motor speed and low wheel speed and a stator fixed within said tubular support housing.

8. In a drive axle assembly; a tubular support housing having a large diameter inboard portion and a small diameter outboard portion; a motor mounted on the inboard portion having a wall closing the inboard portion and a drive shaft extending through said wall; an inboard reduction gearset located in said inboard portion and having a sun gear driven by said drive shaft, an output ring gear and a plurality of pinions meshing with said sun and ring gears and mounted on a carrier fixed to said wall; an intermediate drive member connected to said ring gear; a hydrodynamic retarder having a stator fixed inside of said inboard portion and a rotor fixed to said intermediate member; a wheel having inboard and outboard bearings mounted on the external surface of said outboard portion; a seal between said wheel and outboard portion inboard of said inboard bearing; a rotary cup-shaped gear housing having a diameter substantially the same as said inboard portion and fixed and sealed to said wheel and closing the outboard end of the gear chamber closed at the inboard end by said seal, said support housing and wall; outboard compound reduction planetary gearing with a larger diameter than said outboard portion and having first and second gearsets each having a carrier, a sun gear, a ring gear and pinions meshing with the sun and ring gears and mounted on the carrier with the first carrier connected to drive said rotary housing, the first sun gear driven by said intermediate member, the first ring gear connected to the second sun gear, the second carrier fixed to said outboard portion and the second ring gear fixed on said rotary housing.

9. The invention defined in claim 8 and a source of fluid under pressure; said motor having a cooling system connected to said source and supplying fluid to said inboard gearset; a retarder valve selectively connecting said source to said retarder for braking and evacuating said retarder; a passage connecting said source through said outboard portion to the central portion of said outboard gearing to lubricate said gearing and collect under centrifugal pressure at the outer perimeter of said rotary housing; an exhaust passage in said outer portion and a scoop tube receiving fluid at the outer perimeter of said rotary housing and delivering the fluid to said exhaust passage.

10. In a drive axle assembly; a cylindrical tubular support housing having an inboard portion and an outboard portion; a motor mounted on the inboard portion having a wall closing the inboard portion and a drive shaft extending through said wall; a hydrodynamic retarder having a stator fixed inside said support housing adjacent said wall and a rotor having a central aperture; compound planetary reduction gearing located inside the outboard portion of said support housing having first and second gearsets each having a carrier, a sun gear, a ring gear and pinions meshing with the sun and ring gears and mounted on the carrier and with the first carrier and second ring gear connected for an output, the first sun gear driven by said drive shaft, the first ring gear connected to the second sun gear and the second carrier fixed to said outboard portion; a planetary gearset having a carrier, a sun gear fixed to the first carrier and a ring gear fixed to said outboard portion and pinions on said carrier meshing with said sun and ring gears; a wheel having inboard and outboard wheel bearings mounted externally on said outboard portion for rotation of said wheel on said outboard portion of said support housing; a seal between said wheel and support housing on the inboard side of said inboard wheel bearing, a cup-shaped rotary drive housing secured and sealed to said wheel and secured to said last mentioned carrier and with said support housing, seal, wall and wheel forming a chamber enclosing said wheel bearings and gearing.

11. The invention defined in claim 10 and a source of fluid under pressure; said motor having a cooling system connected to said source and supplying fluid to said chamber to lubricate the gearing; a retarder valve connected to said source and exhaust and selectively filling and evacuating said retarder; an exhaust passage leading from between said inboard wheel bearing and said seal and said rotary drive housing and wheel during rotation collecting fluid which was supplied to lubricate the gearing under centrifugal pressure head at the outer perimeter causing the fluid to flow through the outboard and inboard wheel bearings to said exhaust passage.

12. In a drive axle assembly; a tubular support housing having an inboard portion and an open outboard end; a high speed motor means mounted on and closing the inboard portion of said tubular support housing and having a drive shaft extending axially of said tubular support housing; inboard and outboard wheel bearings mounted on an intermediate external portion of said tubular support housing; a wheel mounted on said wheel bearings; a seal between said wheel and support housing on the inboard side of said inboard wheel bearing; a rotary closure housing sealed and secured to said wheel for rotation with said wheel and enclosing the outboard end of said tubular support housing and providing in conjunction with said support housing a gearing and wheel bearing chamber; reduction gearing mounted on said support housing and within said closure housing driven by said drive shaft and drive connected to said rotary housing to drive said wheel at a reduced speed; said rotary housing having an outer perimeter wall having an annular internal surface defining said gearing and wheel bearing chamber closely surrounding said reduction gearing and lubrication means including a source of lubricating fluid under pressure having a pump and pressure regulator means, passage means in said tubular support housing connected to said source inboard of said wheel bearings and supplying lubricating fluid centrally to said reduction gearing and said reduction gearing during rotation throwing lubricating fluid against said internal surface and centrifugal force holding said fluid during rotation under pressure against said internal surface and means to continuously evacuate the lubricating fluid held under pressure against said internal surface and return said lubricating fluid to said source for continuously supplying lubricant to said reduction gearing, throwing lubricant to said internal surface and evacuating lubricating fluid from said chamber.

* * * * *

PO-1050
(5/69)

UNITED STATES PATENT OFFICE
CERTIFICATE OF CORRECTION

Patent No. 3,770,074       Dated November 6, 1973

Inventor(s) Warren S. Sherman

It is certified that error appears in the above-identified patent and that said Letters Patent are hereby corrected as shown below:

Column 8, claim 7, line 2, "gearset located" should be -- drive member;--; line 6, "on" should be -- sealed --; line 9, "stator" should be -- second --; line 13, after "retarder" insert -- having --.

Signed and sealed this 7th day of May 1974.

(SEAL)
Attest:

EDWARD M.FLETCHER,JR.
Attesting Officer

C. MARSHALL DANN
Commissioner of Patents